Figure 1:
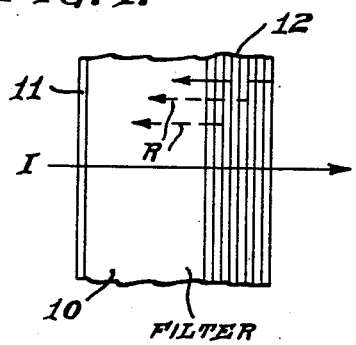

July 9, 1946.   L. T. SACHTLEBEN ET AL   2,403,685
LIGHT FILTER
Filed March 31, 1941

Inventors
Lawrence T. Sachtleben
& William L. Douden
By
Attorney

Patented July 9, 1946

2,403,685

UNITED STATES PATENT OFFICE 2,403,685

LIGHT FILTER

Lawrence T. Sachtleben, Indianapolis, Ind., and William L. Douden, Philadelphia, Pa., assignors to Radio Corporation of America Application March 31, 1941, Serial No. 386,144

2 Claims. (Cl. 88—105)

This invention relates to a light filter consisting of a plurality of filter elements and is particularly adapted for use in light dividers, railway signals and similar devices where it is desirable for the transmissive and reflective characteristics of the light filter to be separately determinable.

Light filters have heretofore been made in many varieties, the most common varieties being those embodying a transparent colored material which could be either solid or liquid or even semi-solid. In the liquid filters practically any type of solvent and soluble color could be used but these were inconvenient and inefficient due to the necessity of a containing cell. Among the solid filters, those of gelatin and glass or combination of the two are most usual. The gelatin filters have the disadvantage that only water soluble colors which do not attack the gelatin can be used and the material is very delicate, being readily damaged by moisture or any mechanical contact. The gelatin filters like the liquid filters must be enclosed between appropriate protecting plates. The glass filters are the most satisfactory from the mechanical standpoint but only a limited number of colors is available and these are difficult to control. Many of the filters in each of these types have wide transmission bands or have several transmission bands in different portions of the spectrum. In the latter case particularly, the width of one transmission band cannot be narrowed by increasing the thickness of the filter or the quantity of coloring material because the other transmission band may not be narrowed proportionally and a totally different color may result.

Dichroic filters are also known in which a color is reflected other than that which is transmitted. For example, a thin film of gold will reflect a yellowish red light and transmit green. Eosin transmits red and reflects green, etc. Such dichroic filters, like the transparent filters referred to above, depend for their characteristics upon the material of which they are composed.

It has heretofore been proposed to make a dichroic filter by forming alternate layers of material having a high index and a low index of refraction on the surface of a transparent medium, these layers having a thickness of a quarter of a wave length of the light which is to be reflected. As described, for example, in the Physical Review for June 1939 at page 1128, such films, by using a sufficient number of layers, can be made highly reflective to one desired color or highly transmissive of another desired color but it is practically impossible to give them band pass characteristics in both respects. The expense of depositing such layers is rather high and the cost of depositing a sufficient number of layers to secure an adequate filtering effect is such as to render them commercially impractical.

The filter of the present invention is an improvement on all of the preceding types of filters and involves the use of a solid filter material such for example as glass having its band pass characteristics supplemented by a multi-layer coating on the surface thereof which may accentuate or sharpen the band pass characteristic of the glass filter and which may reflect a color either complementary to that transmitted by the glass, or a color which is one of those transmitted by the glass, or both.

One object of the invention is to provide an improved light filter.

Another object of the invention is to provide a light filter which is more selective than those heretofore made.

Another object of the invention is to provide a dichroic light filter, the reflective characteristics of which may be made more or less independent of the transmissive characteristics.

Another object of the invention is to provide an improved light divider.

Another object of the invention is to provide a light filter for use in a signal light.

Figure 2:
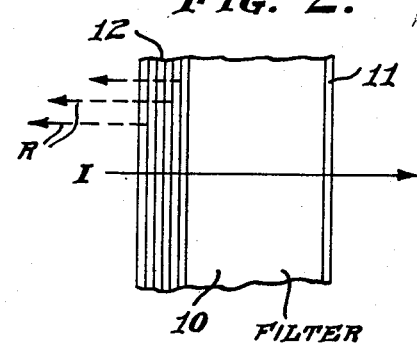
Figure 3:
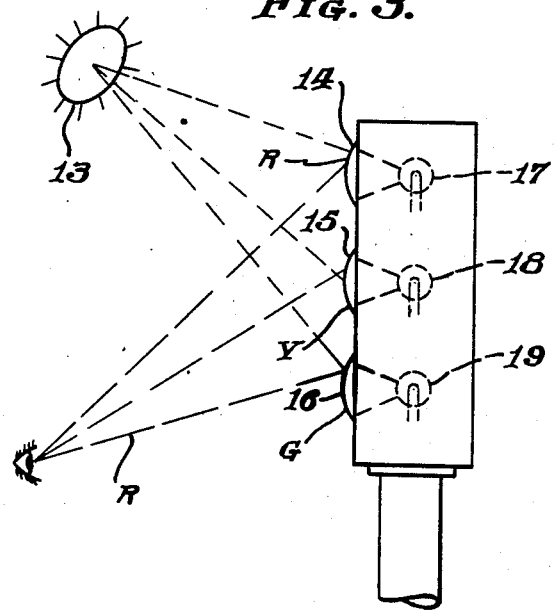
Figure 4:
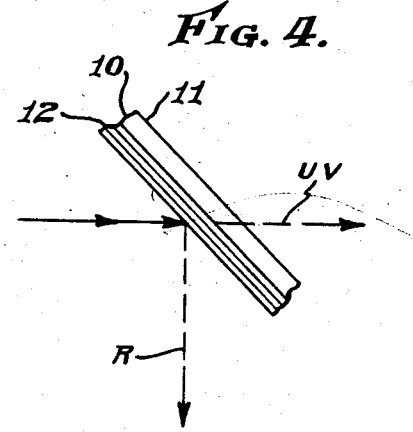

Other and incidental objects of the invention will be apparent to those skilled in the art from a reading of the following specification and an inspection of the accompanying drawing in which Figure 1 is a sectional view of one type of light filter, Figure 2 is a sectional view of a second type of light filter, Figure 3 shows the application of the improved light filter to one type of signal light, and Figure 4 shows the application of the improved light filter to a light divider.

Referring first to the form of the invention shown in Figure 1, incident light indicated at I may enter the filter material 10 from the left and travel in the direction of the solid arrow. The side of the material 10 which the light strikes is preferably provided with a coating 11 of transparent material which coating may have a thickness of one-quarter wave length for the light which is to be predominantly transmitted, and an index of refraction, preferably of or approaching the geometrical mean between that of the filter material 10 and air. The filter material 10 will, for purposes of illustration, be referred to as glass, although any other solid transparent material capable of being appropriately colored or having an appropriate color may be used. On the exit side of the filter material 10, a plurality of layers of transparent material are provided as indicated at 12. These layers are alternate layers of low index and high index material, such, for example, as calcium fluoride having an index of refraction of approximately 1.3 and titanium dioxide having an index of refraction of approximately 3.0. These films, as pointed out in the publication above referred to, may have a thickness of one-quarter of a wave length of the light which is to be primarily reflected. The characteristics of this filter layer 12 must be chosen with due regard to the characteristics of the filter layer 10. For example, the filter layer 10 may be a glass which, when subjected to ordinary white light, appears to transmit green but which actually transmits various portions of the spectrum including the red and which gives a subjective effect of green. In such cases, the filter layer 12 might be chosen to reflect the red light which the filter layer 10 would transmit. In this case, if white light were incident on the right side of the filter and traveled toward the left, the light would appear to be green, while, if the white light were incident on the left side of the filter, as indicated at I, the light reflected as indicated by the dotted arrows R would be the shade of red transmitted by the filter layer 10, and the reflected light would appear to be red.

It is not necessary in all cases that the light transmitted and the light reflected shall be true complementaries. These colors may be different colors which are reasonably close to each other in the spectrum, or they may be purely subjective complementaries, as, for example, subjective yellow can be produced from a mixture of green and red light, and a filter transmitting such a subjective yellow could be provided with a reflecting layer 12 which reflected either the green or red transmitted by the filter layer 10 and transmitted in preponderance of the other color. In this case, the filter layer 10 which would produce a subjective yellow would not determine either the reflected or transmitted color but would determine only which colors were to be separated by the multilayer 12.

In the form of the invention shown in Figure 2, the complex layer of the multilayer 12 is located on the incident side of the filter 10 which may be provided with a nonreflecting one-quarter wave length layer 11 on the opposite side. In this arrangement, the light-selective effect may be secured as to light incident from the left independent of the bandpass characteristics of the filter 10, while the light transmitted from right to left is determined by the combined characteristics of the layer 12 and the body 10. In this arrangement, as compared with the first arrangement, the body 10 might, for example, be of such color as to transmit a spectrum green without any appreciable transmission at other wave lengths, while the layer 12 might be composed of sublayers of such thicknesses as to predominantly transmit the same color of green as that selected by the body 10 and to selectively reflect at R the complementary colors.

It will be apparent that the particular colors referred to with each of the examples given above are merely illustrative and that the body 10 may be chosen from the available materials to have any desired transmission characteristics, while the layer 12 may be chosen in either of the relations thereto indicated above.

One practical application of this improved light filter is shown in Figure 3, where the invention is illustrated as applied to a conventional traffic signal.

The greatest danger in the use of colored light or colored lenses in conjunction with signals, whether they be road traffic signals or railway traffic signals, or signals for other purposes where brilliant lights may strike the signal glasses, is the danger of what is usually referred to as a "false clear." This danger is even greater than the danger of a completely inoperative signal. If a signal is obviously completely inoperative, it will, of course, be treated as a caution or danger signal. However, a signal may be inoperative, or it may even be operative, and light from an extraneous source may strike the "clear" signal and be reflected back, giving the impression that the signal is set at clear when this is not actually the case. For example, in the type of traffic signal shown in Figure 3, if the lenses 14, 15 and 16 are of the conventional type with the upper lens 14 red, the middle lens 15 yellow, and the lower lens 16 green, as usual, light from the extraneous source 13 such, for example, as the sun, might strike the green signal 16 and be reflected back from the inner surface of the lens, giving an approaching motorist the impression that the green signal was actually lighted when, as a matter of fact, the red signal might be lighted but might not be visible to him due to his position or due to the greater apparent intensity of the green signal. If, under this circumstance, he attempted to cross the intersection at high speed while the traffic signal in the other direction was actually green, the results might be disastrous.

In the application of our invention to this situation, the red signal 14 may be of the usual type or may be treated on both surfaces with one-quarter wave length nonreflecting coating, such as indicated at 11 in Figures 1 and 2, or it may be treated on either surface with a multilayer coating, such as indicated at 12, which will reflect a certain percentage of red light. In this case, any light from this signal glass, whether it be transmitted or reflected, will be red. The red-reflecting coating will, of course, decrease the transmission of the red to a certain extent, but this disadvantage may be minimized by placing a reflecting coating on the inner surface of the lens and making it of such a thickness that the center of its transmission band is not directly in the center of the transmission band of the red glass used.

The yellow or caution signal 15 may likewise be treated with the nonreflecting coating 11 on both surfaces or may be left untreated, since the worst that reflected light can accomplish is to produce a false caution signal. If it is desired, however, to distinguish between transmitted light and reflected light, the inner surface of the lens 15 may be coated with a multilayer 12 which will reflect red light to which the yellow or amber lens 15 is transparent. Most yellow filters appear yellow, not because they transmit only yellow but because they absorb only the blue end of the spectrum, permitting such a mixture of colors in the remainder of the spectrum to pass as to produce the visual appearance of yellow. In other words, the light transmitted by a yellow filter is usually a subjective yellow rather than a spectrum yellow. If a red-reflecting layer is placed on the inner surface of this lens, it will not materially affect the color balance of the transmitted light and will decrease the transmitted light only a negligible fraction, while, if light from an extraneous source is reflected from this rear layer of the lens, the reflected light will appear red and a person relying upon the signal will be correspondingly warned.

The green or "go" signal 16 is the one which is the greatest potential source of danger. This signal may be, as pointed out above, of a material which transmits subjective green, i. e., a color which appears green to the eye but which also transmits a considerable portion of red. If the signal material is of this type, the inner surface of this lens 16 may be coated with a red-reflecting layer 12 and, while light from the lamp 19 will appear to be green when transmitted, any light from an extraneous source, which is reflected by the inner layer of the lens 16, will appear to be red. If the material of which the lens 16 is composed is of the type which has a bandpass characteristic in the green and does not have an appreciable transmission in the red, the arrangement shown in Figure 2 may be used. In this case, the red-reflecting layer is placed on the outer surface of the lens and any incident light from extraneous sources is necessarily reflected as red light, while light from the source 19 is not interfered with. It will be apparent that, with either of the foregoing arrangements, it will be impossible for the signal to show a "false clear." Instead of the green signal 16 being arranged to reflect red light, the layer thicknesses may be so chosen that yellow light will be reflected, thereby giving a caution instead of a danger signal. It is quite possible, of course, for the signal to show a false danger signal or caution signal, but this, at the worst, involves only a silght delay while the signal is investigated or more closely observed. If the selectively reflecting surface is to be applied to the inner surface of the lens in this case, the glass or other material must be so chosen that it is capable of transmitting the yellow light, but in the alternate form, wherein the reflected surface is applied to the outer surface of the lens, it may be used if the lens is not transparent to yellow.

A different application of the invention is illustrated in Figure 4, where the improved filter is applied to a light divider. In this instance, use is made of the absorptive characteristics of filter 10 and the selectively reflective characteristics of the layer 12 to an even greater extent than in the preceding example. This type of light divider may, as an example, be applied to sound-recording spectrum systems where it is desired to record sound by means of ultra-violet light. The known ultra violet filters which are highly transparent to ultra violet and highly opaque to most visible light nevertheless transmit a considerable portion of the deep red, and it has heretofore been very difficult to eliminate this deep red color without a considerable loss of ultra-violet. When ordinary sound-recording film is used, the difficulty from this source is not serious, but, if it is desired to use panchromatic film, it is desirable to eliminate the red light. In the present instance, this is accomplished by making the filter body 10 of an ultra violet transmitting filter of appropriate thickness and by applying a layer 12 which is highly reflective in the red. The red light reflected by the layer 12 may be applied to an appropriate monitoring device, as described, for example, in Dimmick application Serial No. 372,811, filed January 2, 1941, now Patent No. 2,338,234 of January 4, 1944. In this application of the invention, it will be apparent that the selectively reflected layer 12 separates the red light, as in the said Dimmick application, but that, instead of all the complementary colors being transmitted, the only colors transmitted are those which are neither reflected by the layer 12 nor absorbed by the filter body 10 and, in the present instance, only the ultra violet is transmitted.

It will be apparent from the foregoing examples that the improved filter may be used to transmit one portion of the spectrum and to reflect the complementary portion, or it may be used to transmit one portion of the spectrum and to reflect a supplementary portion which is not directly complementary. As in the case of the green signal referred to above, the light reflected may be subjectively complementary but objectively only supplementary to the light transmitted by the filter.

It will be apparent that the invention is not limited to the use of the selectively reflecting coating on only one surface of the filter body but that the selective coating may be used if desired on both surfaces thereof. This arrangement is particularly desirable where the filter body is highly transmissive of the color which the selective reflector is intended to eliminate and this form of the invention is particularly applicable to the divider arrangement shown in Fig. 4.

We claim as our invention:

1. A light filter including a selectively light-transmitting filter body and a selectively light-reflecting coating on the surface thereof composed of alternate layers of high and low index transparent material so selected and of such thickness in relation to the light transmitted by the filter body as to be predominantly reflective of a color subjectively complementary to that transmitted by said body and predominantly transmissive of at least a portion of the light transmitted by said body.

2. A light filter including a selectively light-transmitting filter body and a selectively light-reflecting coating on the surface thereof composed of alternate layers of high and low index transparent material so selected and of such thickness in relation to the light transmitted by the filter body as to be predominantly reflective of a color subjectively complementary to that transmitted by said body and predominantly transmissive of at least a portion of the light transmitted by said body, and a transparent layer of material on the other surface of said body of such index of refraction and thickness in relation to the light transmitted as to reduce the surface reflection of the light transmitted by both said body and the selective coating.

LAWRENCE T. SACHTLEBEN.
WILLIAM L. DOUDEN.